United States Patent Office 3,408,212
Patented Oct. 29, 1968

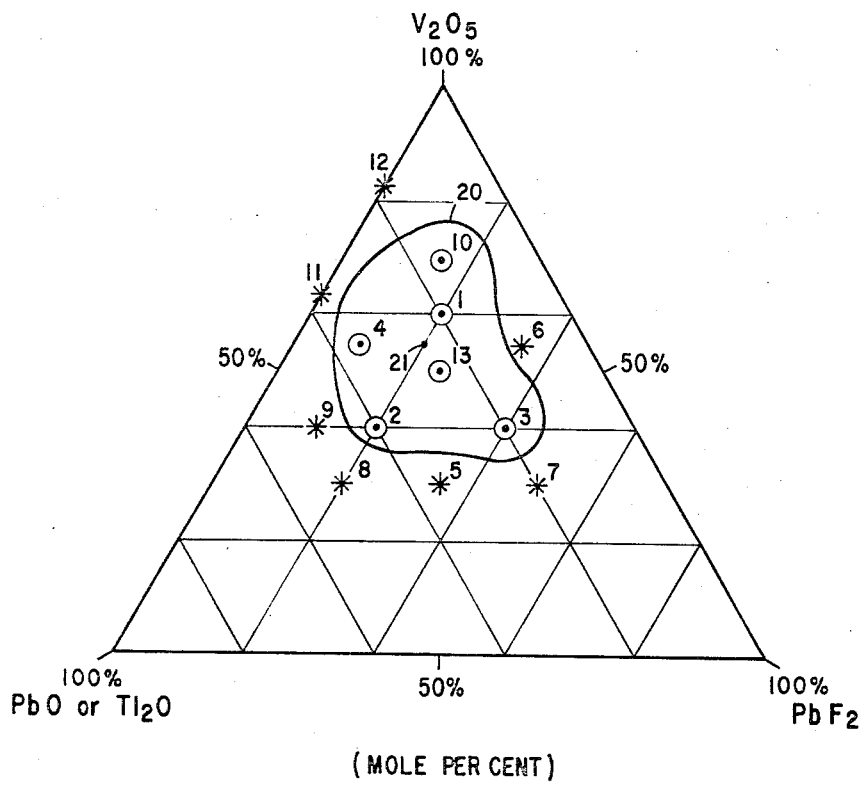

3,408,212
LOW MELTING OXIDE GLASS
Maurice E. Dumesnil, Palo Alto, Calif., assignor to Fairchild Camera and Instrument Corporation, Syosset, N.Y., a corporation of Delaware
Filed June 4, 1965, Ser. No. 461,325
6 Claims. (Cl. 106—47)

ABSTRACT OF THE DISCLOSURE

A composition consisting essentially of a combination of $V_2O_5$, $PbF_2$, and either PbO or $Tl_2O$, the proportions being selected as described so as the composition will form a glass without need of additional components.

---

The invention relates to a low melting glass composition particularly useful for the encapsulation of semiconductor devices. More specifically, the invention is directed to a glass composition containing $V_2O_5$, $PbF_2$, and an oxide of a metal selected from the class consisting of Pb and Tl as its primary components.

Medium and high melting glasses (e.g., melting points above 600° C.) have long been well known in the art. U.S. Patents 2,946,704 and 2,949,376 show such conventional glass enamels. These enamels contain large proportions of what are traditionally termed "glass formers," such as $SiO_2$ and $B_2O_3$, in combination with other oxides. It has long been established in the art that the presence of these glass formers is what makes it possible to maintain an amorphous state. Without them, no oxide glass can be formed.

The above glass compositions have a serious disadvantage in the semiconductor industry where a glass melting in the range of 250° to 400° C. is most desirable for encapsulation of semiconductor devices. The melting points of these prior art glass compositions are normally in excess of 420° C. Furthermore, as an additional restriction, these glasses must match the thermal expansion rate of the metal leads used on the semiconductor device, and must possess no components which are deleterious to the underlying delicate semiconductor device.

Contrary to the normal requirements established in the art, a new glass composition has been discovered which contains none of the conventional glass formers, such as $B_2O_3$ and $SiO_2$. This new glass composition has a melting point in the range from about 250° to 400° C., making it highly desirable for use in semiconductor device systems. The composition contains no components deleterious to semiconductor devices, and achieves a glass which is thermally matched to the metal leads. Briefly, the glass composition of this invention contains at least 75% by weight of a combination of $V_2O_5$, and oxide of a metal selected from the class consisting of Pb and Tl, and $PbF_2$ (the amounts of each of these components being selected from within the enclosed curve shown in FIG. 1). The resulting glass compositions not only have a desirable melting point and the ability to thermally match metals in the thermal expansion range of 7 to $15 \times 10^{-6}$ per degree centigrade, but also are relatively free of cracking and are able to stand temperatures up to about 200° C. without any undesirable side effects. These glasses become fluid in the range of about 280° to 400° C., so that silicon semiconductor materials, including, for example diodes, transistors, and microcircuits, may be embedded in the glass without deleteriously affecting their properties. This is particularly important with respect to silicon-metal systems, such as silicon-gold, which has a eutectic point of 380° C., and metal systems such as aluminum-gold, which interdiffuses rapidly at temperatures above about 350° C.

The details of the glass compositions of this invention will be more fully set forth below, with reference to the single drawing which shows the range of compositions of the three primary glass components useful in this invention.

At least 75% of the glass composition of the subject invention should be selected from a composition mixture shown in the drawing within the enclosure 20. Selecting point 21 on the graph, for example, it is apparent that at least 75% of the glass mixture at point 21, within the scope of this invention, has the following composition: 55% $V_2O_5$, 25% PbO or $Tl_2O$ and 20% $PbF_2$. A preferred glass composition of this invention contains from about 40 to 70 mole percent $V_2O_5$, 10 to 40 mole percent $PbF_2$, and from about 20 to 40 mole percent of an oxide of a metal selected from a class consisting of Pb and Tl.

In addition, the glass composition may have an additional 0.5 to about 35 mole percent $Al_2O_3$. Furthermore, the mixture may contain up to about 30% $P_2O_5$, up to about 5% ZnO, 8% $ZnF_2$, and up to about 8% $BaF_2$, BaO, $SrF_2$, SrO, MgO, $CaF_2$, CaO, $MoO_3$, $Rb_2O$, $Cs_2O$, $WO_3$, or $Ag_2$. Each of these additional materials, either alone or in any combination with the other materials, improves the chemical stability of the glass. With these materials included in the glass composition, the likelihood of devitrification, which is undesirable in the glasses of this invention, is greatly reduced.

Without intending to limit the scope of the invention, as set forth in the appended claims, there are certain preferred glass compositions which have been found to have excellent properties for the purposes of this invention. They are therefore set forth below.

EXAMPLE I

A glass having the following composition was prepared by melting in a platinum crucible:

|  | g. |
|---|---|
| $V_2O_5$, (40 mole percent) | 33.8 |
| PbO, (20 mole percent) | 20.8 |
| $PbF_2$, (40 mole percent) | 46.0 |

A black glass resulted which softened at 250° C. and was extremely fluid at about 280° C. Silicon devices were encapsulated in this glass which remained stable for hundreds of hours under the conditions of high humidity and high operating voltages.

EXAMPLE II

The composition was the same as Example I except thallium oxide was used instead of PbO. The softening point also was around 250° C., and the other characteristics were similar to Example I.

EXAMPLE III

| Compound: | Percentage |
|---|---|
| PbO | 28.5 |
| $V_2O_5$ | 45 |
| ZnO | 4 |
| $PbF_2$ | 10 |
| $MoO_3$ | 5 |
| BaO | 5 |
| $P_2O_5$ | 1.5 |

The above composition was found to soften at about 350° C. and become extremely fluid at 450° C. Its annealing point was about 300° C. This composition exhibited excellent durability and mechanical strength and possessed a coefficient of thermal expansion approximately matching that of nickel ($130 \times 10^{-7}$ cm./cm./° C.). The glass was found to successfully wet nickel, aluminum, and gold plated Kovar. This glass was also useful as a coating on semiconductor devices, particularly silicon. Its softening and annealing temperature are such that the glass will form a good seal to the majority of metals with widely varying linear thermal expansions used as contact or interconnection materials on semiconductor devices. If desired, the softening point of this glass can be widely varied from about 350° C. to 500° C. by merely increasing the $P_2O_5$ content to increase the softening point.

A series of glasses were manufactured using the mole percentages of $V_2O_5$, set forth in the following table (the numbers correspond to compositions shown on drawing):

TABLE I

| Number on Drawing | Mole Percentage | | | | Softening Point |
|---|---|---|---|---|---|
| | $V_2O_5$ | PbO | $PbF_2$ | $P_2O_5$ | |
| 1 | 60 | 20 | 20 | 0 | 270° C. |
| 2 | 40 | 40 | 20 | 0 | 270° C. |
| 3 | 40 | 20 | 40 | 0 | 250° C. |
| 4 | 55 | 35 | 10 | 0 | 270° C. |
| 5 | 30 | 35 | 35 | 0 | No glass (outside scope of invention). |
| 6 | 55 | 10 | 35 | 0 | Do. |
| 7 | 30 | 20 | 50 | 0 | Do. |
| 8 | 30 | 50 | 20 | 0 | Do. |
| 9 | 40 | 50 | 10 | 0 | Do. |
| 10 | 70 | 15 | 15 | 0 | 400° C. |
| 11 | 64.8 | 36 | ------ | 0 | { Glass devitrified readily in remelting. |
| 12 | 83 | 17 | ------ | 0 | |
| 13 | 50 | 25 | 25 | 0 | 290° C. |
| | 38 | 19 | 38 | 5 | 290° C. |
| | 36 | 18 | 36 | 10 | 320° C. |
| | 35 | 15 | 35 | 15 | 340° C. |

Each of these glasses, with the exception of numbers 5–9 as noted, performed satisfactorily for the purpose of this invention. Numbers 5–9 are not "glass compositions" within the meaning of that term as applied in this specification.

The above description and specific examples merely illustrate preferred embodiments of the invention. Therefore it is the intent that the scope of this invention be limited only as expressly recited in the claims which follow.

What is claimed is:

1. A glass composition consisting essentially of a combination of $V_2O_5$, PbO, $Tl_2O$ and $PbF_2$, the amount of each of these components being selected from within the enclosed curve in the drawing.

2. A glass composition consisting essentially of from about 40 to 70 mole percent $V_2O_5$, 10 to 40 mole percent $PbF_2$, and 20 to 40 mole percent of an oxide of a metal selected from the class consisting of PbO and $Tl_2O$.

3. The glass composition of claim 1 having in addition from about 0.5 to 35 mole percent $Al_2O_3$.

4. The glass composition of claim 1 having in addition a minor amount less than about 8 mole percent of at least one compound selected from the class consisting of $ZnF_2$, BaO, $BaF_2$, SrO, $SrF_2$, MgO, CaO, $CaF_2$, $MoO_3$, $WO_3$, $Ag_2O$, $Cs_2O$, and $Rb_2O$.

5. A semiconductor device comprising a semiconductor material having a coating of the glass of claim 1.

6. The glass composition of claim 1 having in addition up to about 5% ZnO.

References Cited

UNITED STATES PATENTS

| 2,853,393 | 9/1958 | Beck et al. | 106—47 |
| 3,115,415 | 12/1963 | Hoffman | 106—49 |
| 3,149,234 | 9/1964 | Hood et al. | 106—47 |
| 3,200,310 | 8/1965 | Carman | 317—234 |
| 3,211,826 | 10/1965 | Holcomb et al. | 106—49 |
| 3,241,009 | 3/1966 | Dewald et al. | 317—234 |
| 3,278,317 | 10/1966 | Blair et al. | 106—47 |

FOREIGN PATENTS

| 744,205 | 2/1956 | Great Britain. |
| 165,870 | 11/1964 | U.S.S.R. |

OTHER REFERENCES

Fajans et al.: "Stability of Lead Glasses and Polarization of Ions," J. Am. Cer. Soc., vol. 31 (1948), pp. 113–114.

HELEN M. McCARTHY, *Primary Examiner*.